(12) United States Patent
Stevenson et al.

(10) Patent No.: US 11,074,738 B1
(45) Date of Patent: Jul. 27, 2021

(54) SYSTEM FOR CREATING ANIMATIONS USING COMPONENT STRESS INDICATION

(71) Applicant: Weta Digital Limited, Wllington (NZ)

(72) Inventors: Thomas Stevenson, Wellington (NZ); Andrew R. Phillips, Wellington (NZ); Edward Sun, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

(21) Appl. No.: 17/161,099

(22) Filed: Jan. 28, 2021

Related U.S. Application Data (63) Continuation of application No. 17/120,065, filed on Dec. 11, 2020.

(60) Provisional application No. 63/056,420, filed on Jul. 24, 2020.

(51) Int. Cl.
*G06T 13/40* (2011.01)
*G06T 13/80* (2011.01)
*G06T 19/20* (2011.01)

(52) U.S. Cl.
CPC .............. *G06T 13/40* (2013.01); *G06T 13/80* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 9,454,797 | B2 * | 9/2016 | Popovic | G06T 3/0093 |
| 2012/0218262 | A1 * | 8/2012 | Yomdin | G06T 13/80 |
| | | | | 345/419 |
| 2013/0194280 | A1 * | 8/2013 | Kwon | G06T 13/40 |
| | | | | 345/473 |
| 2018/0025525 | A1 * | 1/2018 | Hessler | G06T 19/20 |
| | | | | 345/420 |
| 2021/0012549 | A1 * | 1/2021 | Comer | G06K 9/00288 |

OTHER PUBLICATIONS

Cad knowledge; "Static simulation for beginners with explanation in solidworks"; Apr. 11, 2020; https://www.youtube.com/watch?v=5fRWIXbeRn0 ; pp. 1-3 (Year: 2020).*
Abaqusfem; "Simulation femur bone fracture under impact step by step in Abaqus;" Jan. 18, 2018; https://www.youtube.com/watch?v=vZEH_IR_A60 ; pp. 1-3 (Year: 2018).*

* cited by examiner

*Primary Examiner* — Peter Hoang
(74) *Attorney, Agent, or Firm* — Trellis IP Law Group, PC (57) ABSTRACT

In an embodiment, an animator is provided with an indication when a model's component such as a joint or limb is being moved or twisted in a way that would be unnatural and cause unusual stress on the model component. For example, as a shoulder joint is stressed by moving an arm in an extreme position a yellow bar or coloring of the shoulder, arm or other component can grow increasingly bright and shift to red just before a breaking point is reached. An animator can choose to go past the breaking point and the breaking can be modeled and incorporated into the animation.

14 Claims, 7 Drawing Sheets

SYSTEM FOR CREATING ANIMATIONS USING COMPONENT STRESS INDICATION

CROSS REFERENCES TO RELATED APPLICATIONS

This application is a continuation of the following application, U.S. patent application Ser. No. 17/120,065, entitled METHODS AND SYSTEMS FOR GENERATING AN ANIMATION CONTROL RIG, filed on Dec. 11, 2020, which claims the benefit of U.S. Provisional Patent Application Ser. No. 63/055,420, entitled METHODS AND SYSTEMS FOR GENERATING AN ANIMATION CONTROL RIG, filed on Jul. 24, 2020, which is hereby incorporated by reference as if set forth in full in this application for all purposes.

FIELD

The present disclosure generally relates to methods and systems for generating an animation using an indication of a stress level being exerted on a component of an animation model.

BACKGROUND

Visual content generation systems are used to generate imagery in the form of still images and/or video sequences of images. The still images and/or video sequences of images include live action scenes obtained from a live action capture system, computer generated scenes obtained from an animation creation system, or a combination thereof.

An animation artist is provided with tools that allow them to specify what is to go into that imagery. Where the imagery includes computer generated scenes, the animation artist may use various tools to specify the positions in a scene space such as a three-dimensional coordinate system of objects. Some objects are articulated, having multiple limbs and joints that are movable with respect to each other.

The animation artist may retrieve a representation of an articulated object and generate an animation sequence movement of the articulated object, or part thereof. Animation sequence data representing an animation sequence may be stored in data storage, such as animation sequence storage described below.

Animation sequence data might be in the form of time series of data for control points of an articulated object having attributes that are controllable. Generating animation sequence data has the potential to be a complicated task when a scene calls for animation of an articulated object.

SUMMARY

In accordance with an aspect, a computer-implemented method for creating an animation includes: displaying an animation model including a component; displaying a control point corresponding to at least one component of the animation model; accepting a signal from a user input device to move the control point; determining a stress amount in response to the moved control point; indicating to a user the stress amount; and creating an animation using a movement derived from the moved control point.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment, the method further includes: determining a stress level of a component of the digital character resulting from movement toward the new pose; and displaying an indicator to visually indicate the stress level.

In an embodiment, the visual indicator includes a color.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described below are methods and systems for generating an animation control rig configured to manipulate a skeleton of a digital character (an "animation skeleton").

Figure 1:
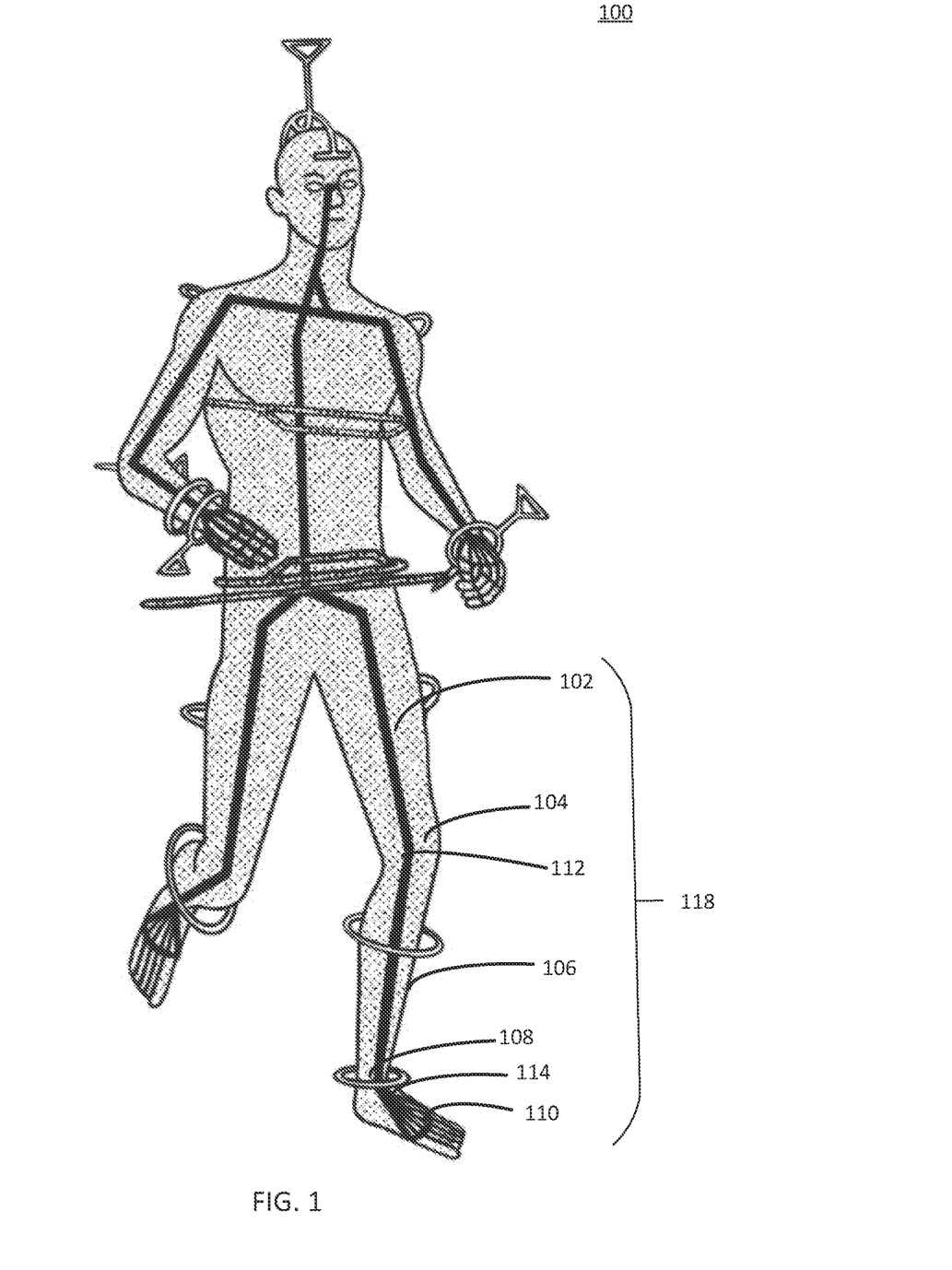
FIG. 1 shows an example of a control rig configured to enable an artist to create animation sequence data.

FIG. 1 shows an example of a control rig 100, or animated skeleton. Control rig 100 is configured to enable an artist to create animation sequence data. Animation sequence data is typically in the form of time series of data for control points of an object that has attributes that are controllable. In some examples the object includes a humanoid character with limbs and joints that are movable in manners similar to typical human movements.

Here, control rig 100 represents a humanoid character, but may be configured to represent a plurality of different characters. In an embodiment control rig 100 includes a hierarchical set of interconnected bones, connected by joints forming a kinematic chain.

For example, control rig 100 includes thigh 102, knee 104, lower leg 106, ankle 108, and foot 110, connected by joints 112, 114 to form a leg appendage 118. Control rig 100 may be employed to individually move individual bones and joints using forward kinematics to pose a character. Moving thigh 102 causes a movement of lower leg 106, as lower leg 106 is connected to thigh 102 via knee 104. Thigh 102 and lower leg 106, for example, are in a parent-child relationship. Movement of lower leg 106 is a product of movement of thigh 102 as well as movement of lower leg 106 itself.

Control rig 100 may also use inverse kinematics, in which an artist moves ankle 108 for example. If an artist moves ankle 108 upwards, knee 104 consequently bends and moves upwards to accommodate a pose in which ankle 108 is at a user specified location.

Control rig 100 may be formed using a plurality of data points. Control rig 100 may be matched to a skeleton obtained from an animation system, or from, for example, motion capture markers or other means on real-life actors. A live action scene of a human actor is captured by live action capture system 702 (see FIG. 7) while wearing mo-cap fiducials for example high-contrast markers outside actor clothing. The movement of those fiducials is determined by live action processing system 722. Animation driver generator 744 may convert that movement data into specifications of how joints of an articulated character are to move over time.

Figure 2:
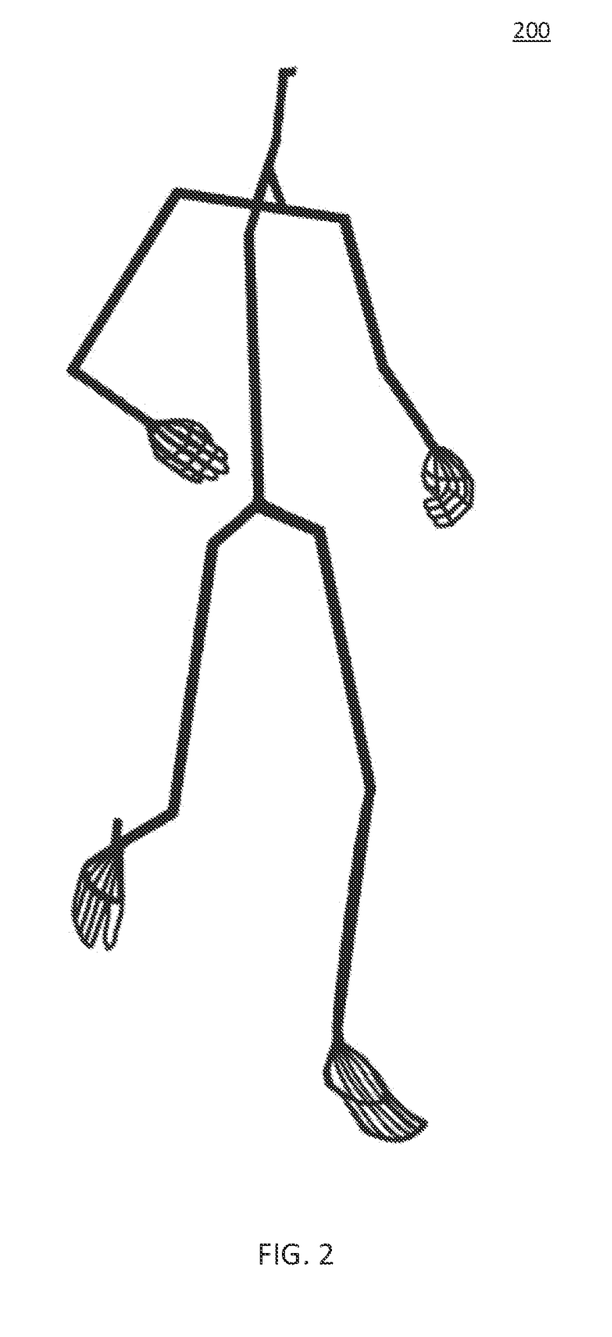
FIG. 2 shows an example of an animation skeleton obtained from an animation system that is matched to the skeleton of the control rig of FIG. 1.

FIG. 2 shows an example of a skeleton 200 obtained from an animation system such as visual content generation system 700.

The motions of control rig 100 are able to correspond to the motions of motion captured skeleton 200 when matched. Control rig 100 may also be controlled freely by an animator to produce motions beyond the motions of a real-life skeleton, such as the real-life skeleton of a human. Control rig 100 may represent a character of a different size to the skeleton of a real-life actor.

Figure 3:
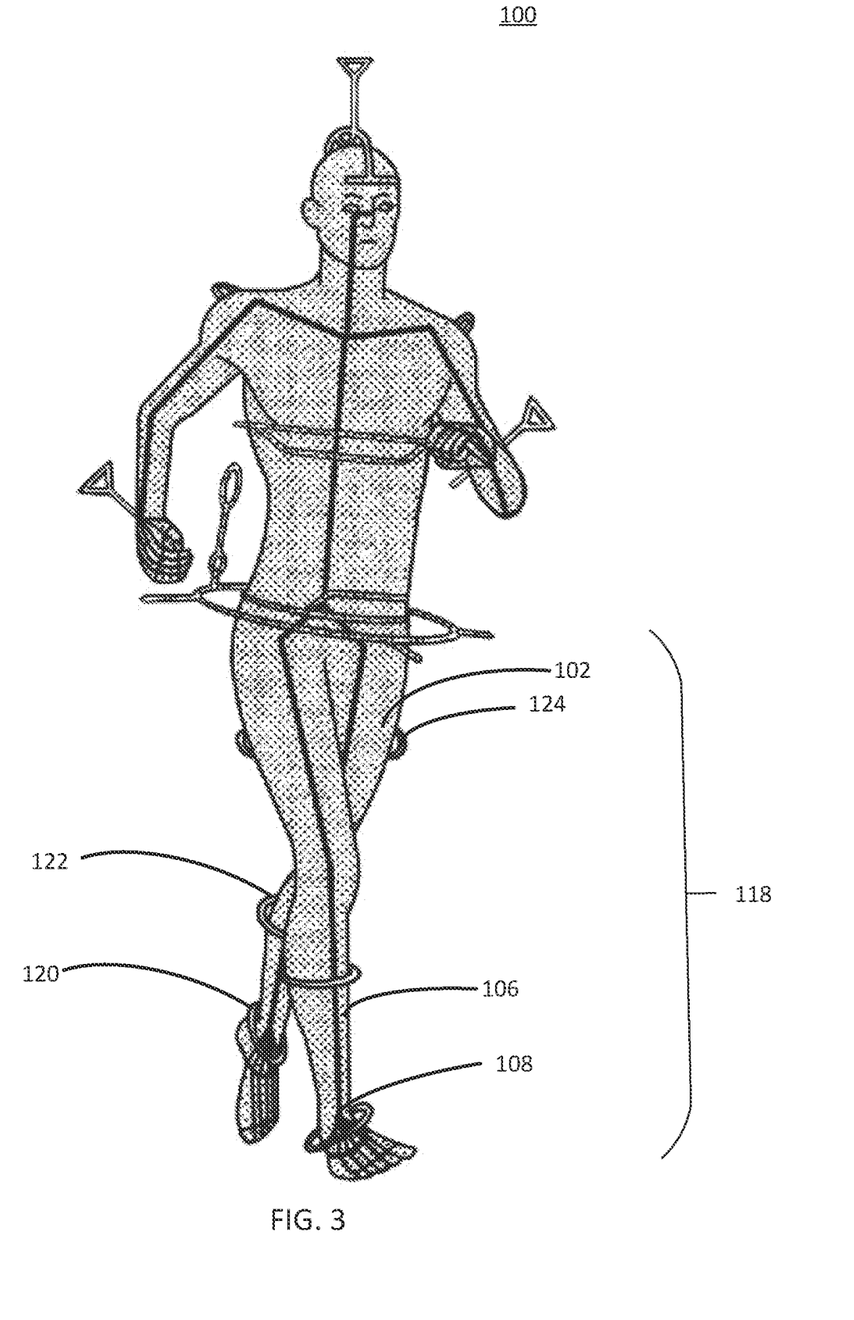
FIG. 3 shows examples of animation control points associated with the control rig of FIG. 1.

As shown in FIG. 3, control rig 100 includes a plurality of animation control points, or control points. Examples of control points are indicated at 120, 122 and 124 respectively. For example, in an embodiment control rig 100 includes control point 120 at the ankle that allows an animator to control the motion of a leg of control rig 100. In another example, control point 122 is positioned at lower leg 106 of rig 100 and/or control point 124 is positioned at thigh 102. Different parts of the control rig 100 have associated to them respective control points.

In an embodiment, an artist may create an animation sequence by selecting a control point on control rig 100. Control rig 100 may be displayed, for example, on display 612 (see FIG. 6). The artist selects a control point using input device 614 and/or cursor 616. The control points may be displayed as extending from a character represented by control rig 100. Displaying the control points in this manner enables the artist to select a control point easily.

Figure 6:
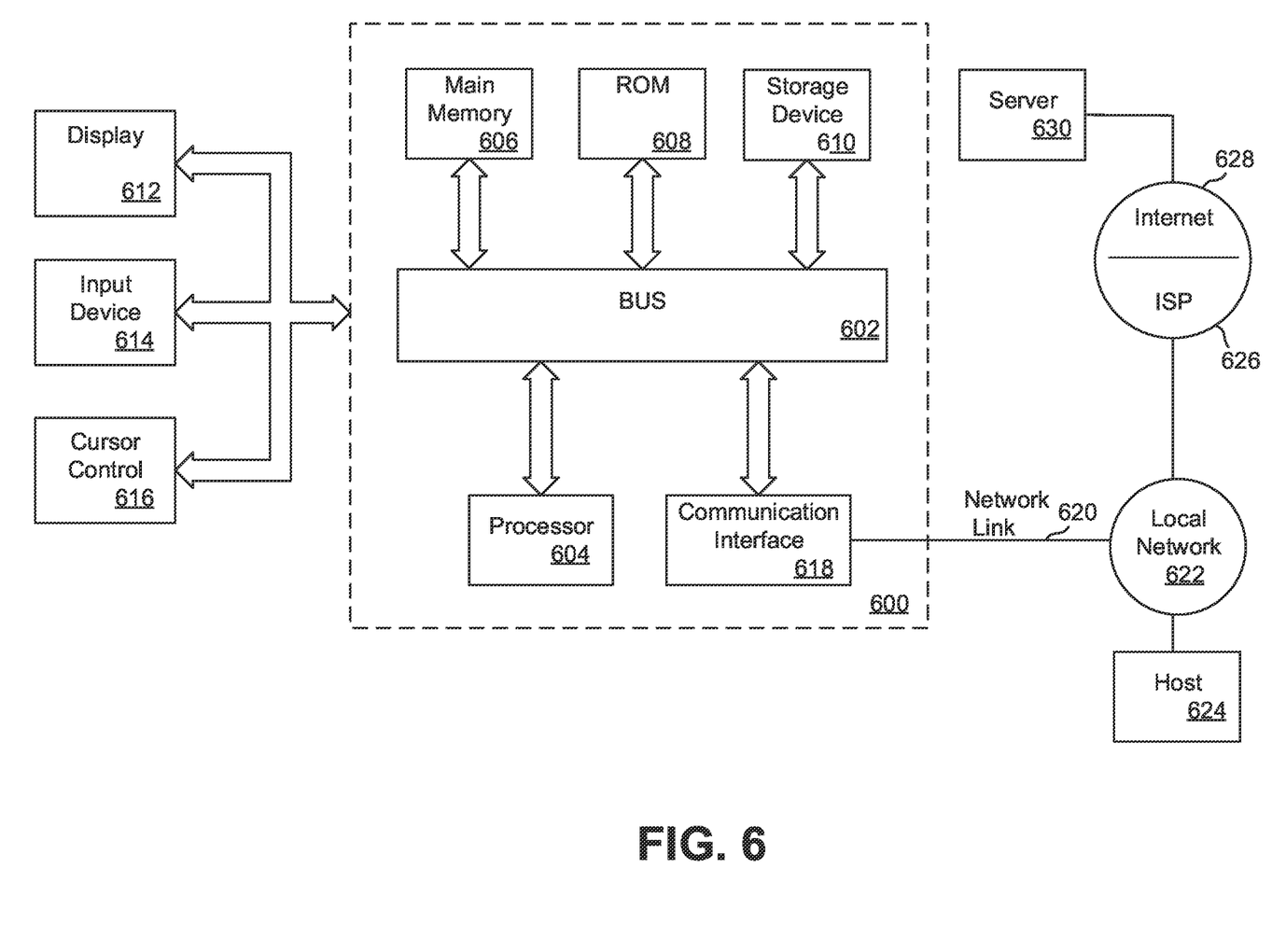
FIG. 6 is a block diagram illustrating an example computer system upon which computer systems of the systems illustrated herein may be implemented.

In an embodiment, operating animation control(s) causes an animated object to be generated. The animated object may be displayed, for example, on display 612 as an image sequence.

The artist may, for example, select control point 122 for the lower leg or control point 124 for the upper leg of control rig 100. The artist selects a position and/or location of the control point that is different to the current position and/or location of the control point. This process is known as key-framing. The artist moves controls to new positions at given times, thereby creating key poses in an animation sequence. Interpolation is performed between key poses.

In different embodiments, different types of controls can be made available to the artist. Typically, graphical user interface (GUI) controls called "handles" are presented to an artist for manipulation. A handle might correspond to movement of a part of a finger, for example. Or a foot, arm bone or any other component or set of components in an animation skeleton or other underlying rig. Usually, the handles are simplified subsets of the component definitions and control points and will not all line up exactly with skeleton components. In other embodiments, there can be a one-to-one correspondence of one or more handles to control points. Or the control points themselves may be presented to an artist or animator for manipulation.

In an embodiment, there can be one-off handles or other controls (e.g., "control shapes") that can allow custom movement of animation models for complex or non-rigid structures such as for a fat belly, a tail, lips, etc. Often animation of caricatures will not closely follow a skeleton and so handles are adapted to handle areas of motion, or other organized systems of movement. Animating face models may not require an underlying skeleton in order to animate the model, or digital character.

In an embodiment, an animator is provided with a visual indication when a joint or limb is being moved or twisted in a way that would be unnatural and cause unusual stress on the model component, were the digital character being modeled to exist in the real world. So, for example, as a shoulder joint is stressed by moving an arm in an extreme position a yellow bar or coloring of a model component can grow increasingly bright and shift to red just before a breaking point or failure point is reached. An animator can choose to go past the breaking point and the breaking can be modeled and incorporated into the animation.

In an embodiment, control points may be used to control more than one bone, joint, etc. For example, a control point may be used to control the upper arm and lower arm at the same time.

In an embodiment, at least one inverse kinematics operation is performed in order to generate the animation sequence specified by the artist. For example, the artist may wish to specify that ankle 108 is to move from a location within control rig 100 shown in FIG. 1 to a location within control rig shown in FIG. 3. The artist manipulates control point 120 to specify a desired change in ankle location.

A series of calculations is performed to determine what changes in location and/or orientation of parts of control rig 100 are required to result in an orientation of control rig shown in FIG. 3. For example, the new location of control point 120 selected by the artist may require a change in location and/or orientation of at least thigh 102, knee 104, lower leg 106, ankle 108 and foot 110. The changes in location and/or orientation that are required to achieve a goal of the artist are then determined.

Figure 4:
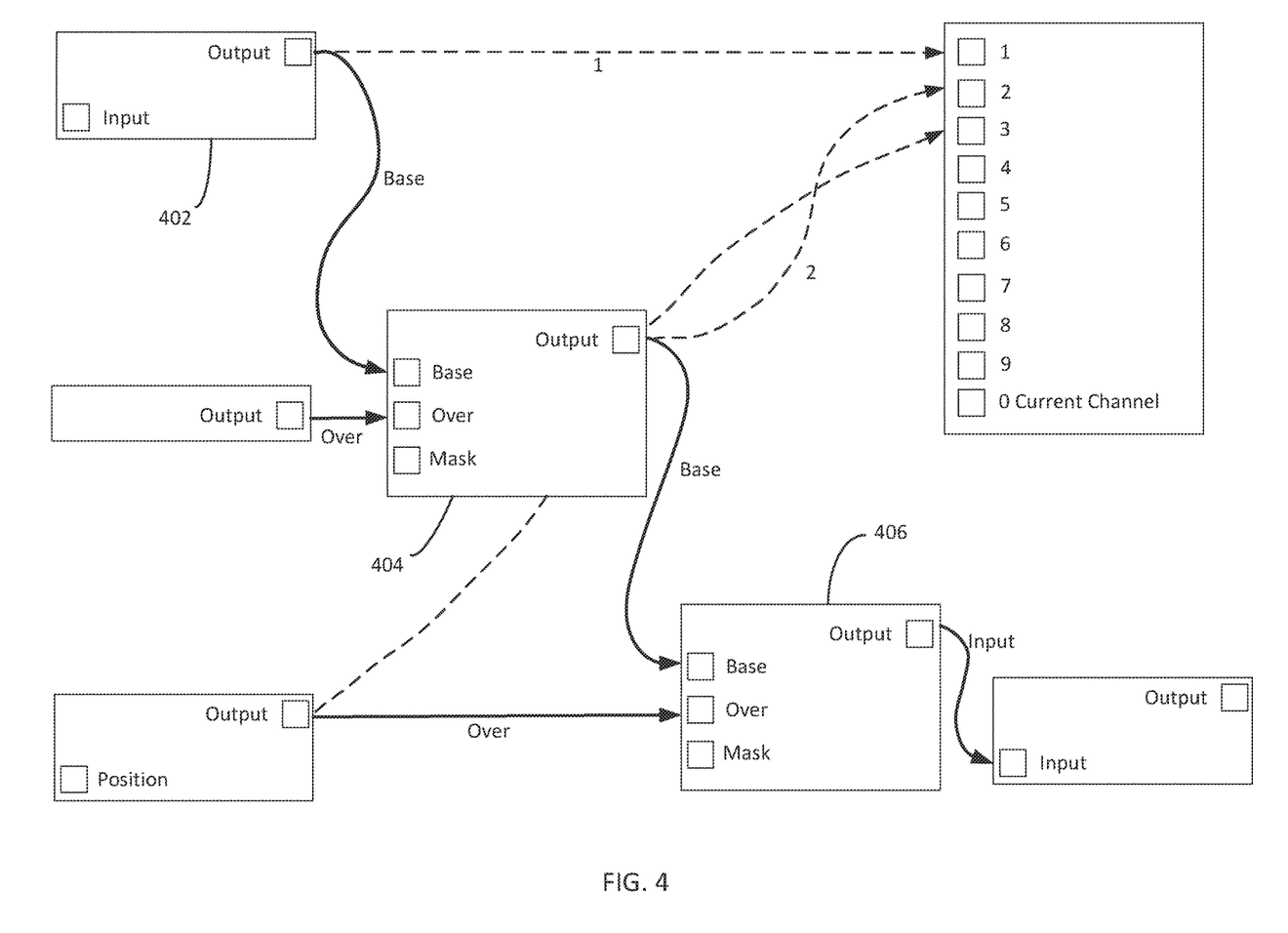
FIG. 4 shows an example of a hierarchical node graph suitable for implementing the control rig of FIG. 1.

FIG. 4 shows an example of a hierarchical node graph 400 suitable for implementing control rig 100 of FIG. 1. Node graph 400 includes a plurality of nodes, examples of which are shown at 402, 404 and 406 respectively. At least some of the nodes are associated with at least one input and at least one output.

In an embodiment one or more nodes of the hierarchical node graph 400 represent respective animation control points of control rig 100. Outputs from individual nodes include the solved positions of each joint angle and bone position in the kinematic chain. In inverse kinematics, the new joint angles and positions are determined relative to the control input. Inputs to the individual nodes include the new position of a member that is then used to calculate the position of the other members of the skeleton and the associated joint angles. For example, moving the hand from a first position resting on the ground to a new position above the ground will be used to determine the position of the forearm, upper arm, and elbow, and shoulder.

In an embodiment, at least one node in hierarchical node graph 400 is inversely solvable through an analytical approach. For example, node 404 has associated to it an inverse kinematics function. The artist selects a position and/or location of control point 120 that is different to the current position and/or location of the control point. Node 402 in hierarchical node graph 400 is identified as corresponding to control point 120. The inverse kinematics function associated to node 402 is applied to control point 120. The output of node 402 becomes an input to node 404. The output of node 404 then becomes the input of node 406.

The result is that the position and angle associated with each node further away from the control point allows the position and/or location of control point 120 to correspond to the position and/or location selected by the artist. In an example, a node that is inversely solvable may involve a problem that has three points of a limb that are analytically solvable using a single solution, such as a trigonometric solution.

In an embodiment at least one node in hierarchical node graph 400 is not inversely solvable through an analytical approach. For those nodes that are not inversely solvable, there is no associated inverse kinematics function. An inverse kinematics function cannot be applied to a control point so that the position and/or location of the control point corresponds to a position and/or location selected by the artist.

In an embodiment control rig 100 and hierarchical node graph 400 are subject to at least one constraint. For example, there may be a finite number of positions and/or orientations that an artist may select for knee 104. Some positions may violate physical constraints that apply to a physical skeleton associated to control rig 100. These physical constraints include biomechanical limitations of movement that apply to a physical skeleton and that are modeled by control rig 100.

Furthermore, some positions may involve applying transformations to at least one node in the hierarchical node graph 400 for which there is no associated inverse kinematics function. Such transformations violate a computational constraint. For example, there may be cases where a node does not have an inverse kinematics function.

In an embodiment, a series of forward kinematics operations are applied to at least one node in hierarchical node graph 400 for which there is no associated inverse kinematics function. The resulting location is compared to the desired location selected by the artist. Any difference in location is compared to a tolerance. If the difference is within the tolerance then the transformation is completed. On the other hand, if the difference in locations is outside the tolerance then a further forward kinematics operation is performed on the node with the intention of achieving a difference between the calculated location and the selected location that is within the tolerance.

In an embodiment, an iterative solve is required where there are overlapping solves associated with a change in a control node. It is possible that some nodes may have more than one associated inverse kinematics function related to multiple parent nodes. Most of the solves are based on trigonometry, so there may be more than one way to solve the equation.

Trigonometric solutions are generally directly solvable. A problem may arise where there are solves that require more than one solve at a time. For example, a solve may be straightforward to determine for a hand position, elbow position, and shoulder position if the hand was fixed relative to the forearm. In other words, a problem that involves three points of a limb is analytically solvable using a single trigonometric solution.

However, the artist may wish to, for example, bend a wrist back and then move the lower arm. There is a choice of trigonometric solutions. A first solution may involve the bent position of the hand, forearm, elbow, and upper arm. A second solution may involve the bent position of the hand and just the end of the forearm. In other words, when more than three points of a limb are involved in a problem, multiple trigonometric solutions involving the same points of a limb may exist. Approximation involving iterative solves may be required in such cases.

A control node selected by the artist may influence multiple parent nodes. The relationship between the control node and each of the multiple parent nodes has an associated inverse kinematics function. Therefore, a changed position and/or orientation of the control node would require multiple inverse kinematics functions to be solved iteratively to determine the positions and/or orientations of the multiple parent nodes.

In an example, when a series of movements of control rig 100 is required to match with a series of movements from a motion captured skeleton, the control points of control rig 100 are controlled by the corresponding positions of the motion captured skeleton. For example, an ankle of the motion captured skeleton drives a corresponding ankle of the control rig. The inverse kinematics operations associated with the ankle node of the control rig are then used to derive the positions and/or orientations of at least thigh 102, knee 104 and lower leg 106.

Figure 5:
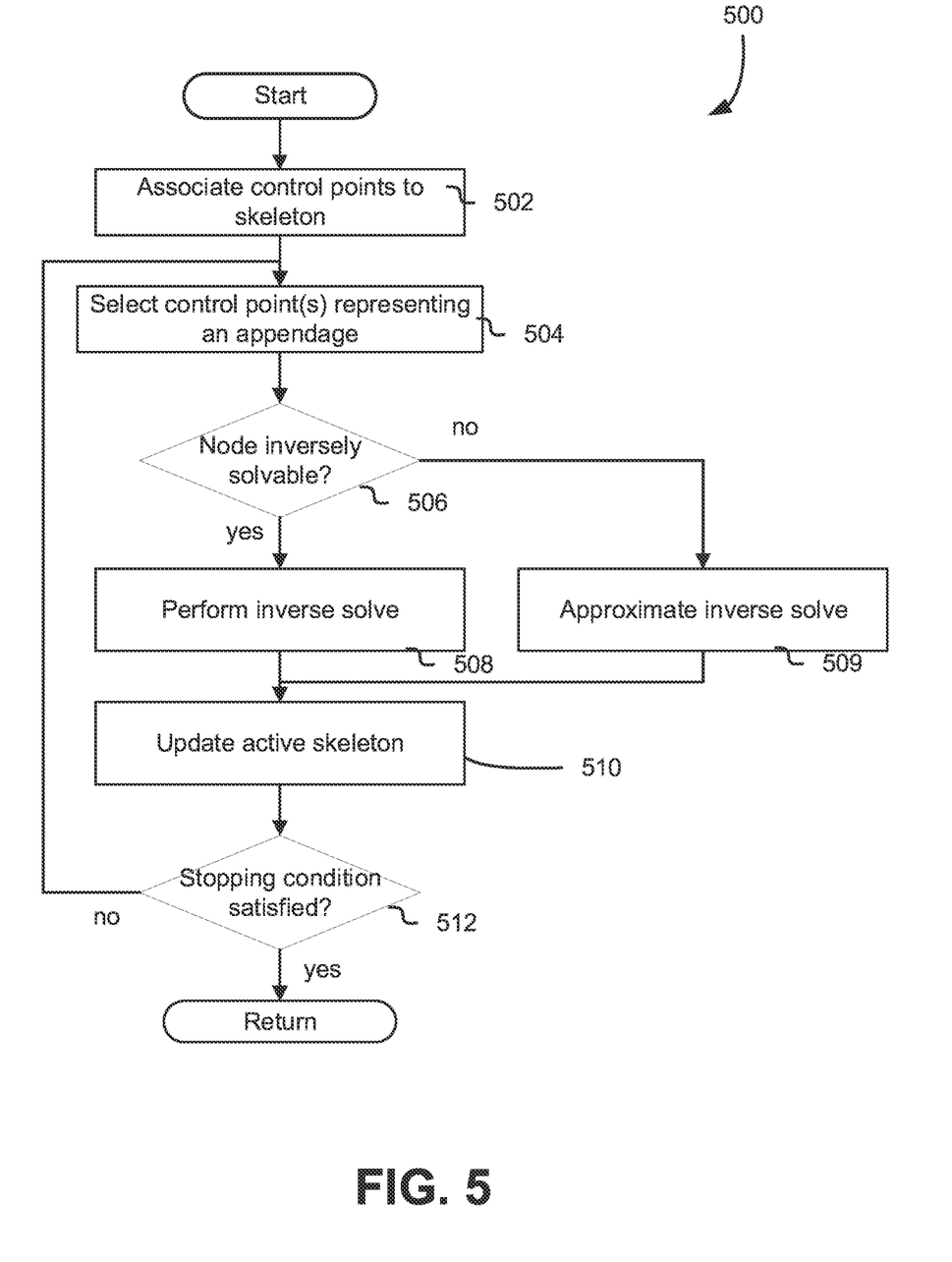
FIG. 5 shows an example method for generating the animation control rig of FIG. 1.

FIG. 5 shows an example method 500 for generating animation control rig 100 of FIG. 1. Method 500 uses inverse solves at an appendage level where possible to determine where controls should be placed and oriented. In an embodiment, control rig 100 is configured to manipulate a skeleton of an animated character.

A plurality of animation control points is associated 502 to an animated skeleton. One example of an animated skeleton is motion captured skeleton 200 (see FIG. 2). Examples of control points include control points 120, 122, and 124 (see FIG. 3). In an embodiment at least one of the control points is associated to at least two members of skeleton 200. For example, a single control point may be associated to at least two bones of skeleton 200.

Method 500 includes traversing a node graph representing the plurality of animation control points of the animated skeleton. One example of a node graph is hierarchical node graph 400 (see FIG. 4) in which nodes in node graph 400 are associated with respective control points such as 120, 122 and 124. It will be appreciated that method 500 can be applied to either directed or undirected graphs, and can be applied to weighted or unweighted graphs.

A first node in node graph 400 is selected 504 for analysis to determine if the first node is inversely solvable. In an embodiment, selecting a node in node graph 400 has the effect of selecting an animation control point represented by the selected node.

If 506 the selected node is inversely solvable then an inverse solve is performed 508 to determine where the animation control point represented by the selected node should be placed and oriented. An operation of the selected node is modified by updating 510 the active skeleton.

In an embodiment, if the selected node is not inversely solvable then an approximation 509 of an inverse solve is obtained. Method 500 attempts to perform a solve as close as possible to the desired position. For example, a desired limb position may not be achievable within the limitations of an animated skeleton. In such cases, a limb position can be determined, within the limitations of the animated skeleton, that is as close as possible to the desired limb position. This approximation may be obtained, for example, using an iterative solve. An operation of the selected node is modified by updating 510 the active skeleton with the approximation.

Once the animated skeleton has been updated 510, a stopping condition is checked 512.

In an embodiment, method 500 is performed at an appendage level. Stopping condition 512 is satisfied when all appendages have been checked. Alternatively, a stopping condition is satisfied when a predetermined number of appendages have been checked. Alternatively, a stopping condition is satisfied when a sufficient number of appendages within a predetermined region of the animated skeleton have been checked.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 6 is a block diagram that illustrates computer system 600 upon which visual content generation system 700 (see FIG. 7) may be implemented. Computer system 600 includes bus 602 or other communication mechanism for communicating information, and processor 604 coupled with bus 602 for processing information. Processor 604 may be, for example, a general purpose microprocessor.

The computer system 600 also includes main memory 606, such as a random access memory (RAM) or other dynamic storage device, coupled to bus 602 for storing information and instructions to be executed by the processor 604. The main memory 606 may also be used for storing temporary variables or other intermediate information during execution of instructions to be executed by the processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a computer monitor, for displaying information to a computer user. An input device 614, including alphanumeric and other keys, is coupled to the bus 602 for communicating information and command selections to the processor 604. Another type of user input device is a cursor control 616, such as a mouse, a trackball, or cursor direction keys for communicating direction information and command selections to the processor 604 and for controlling cursor movement on the display 612. This input device typically has two degrees of freedom in two axes, a first axis (e.g., x) and a second axis (e.g., y), that allows the device to specify positions in a plane.

The computer system 600 may implement the techniques described herein using customized hard-wired logic, one or more ASICs or FPGAs, firmware and/or program logic which in combination with the computer system causes or programs the computer system 600 to be a special-purpose machine. According to one embodiment, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 610. Volatile media includes dynamic memory, such as the main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid state drive of a remote computer. The remote computer can load the instructions into its dynamic memory and send the instructions over a network connection. A modem or network interface local to the computer system 600 can receive the data. The bus 602 carries the data to the main memory 606, from which the processor 604 retrieves and executes the instructions. The instructions received by the main memory 606 may optionally be stored on the storage device 610 either before or after execution by the processor 604.

The computer system 600 also includes a communication interface 818 coupled to the bus 602. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 600, are example forms of transmission media.

The computer system 600 can send messages and receive data, including program code, through the network(s), the network link 820, and communication interface 818. In the Internet example, a server 830 might transmit a requested code for an application program through the Internet 828, ISP 826, local network 822, and communication interface 818. The received code may be executed by the processor 604 as it is received, and/or stored in the storage device 610, or other non-volatile storage for later execution.

Figure 7:
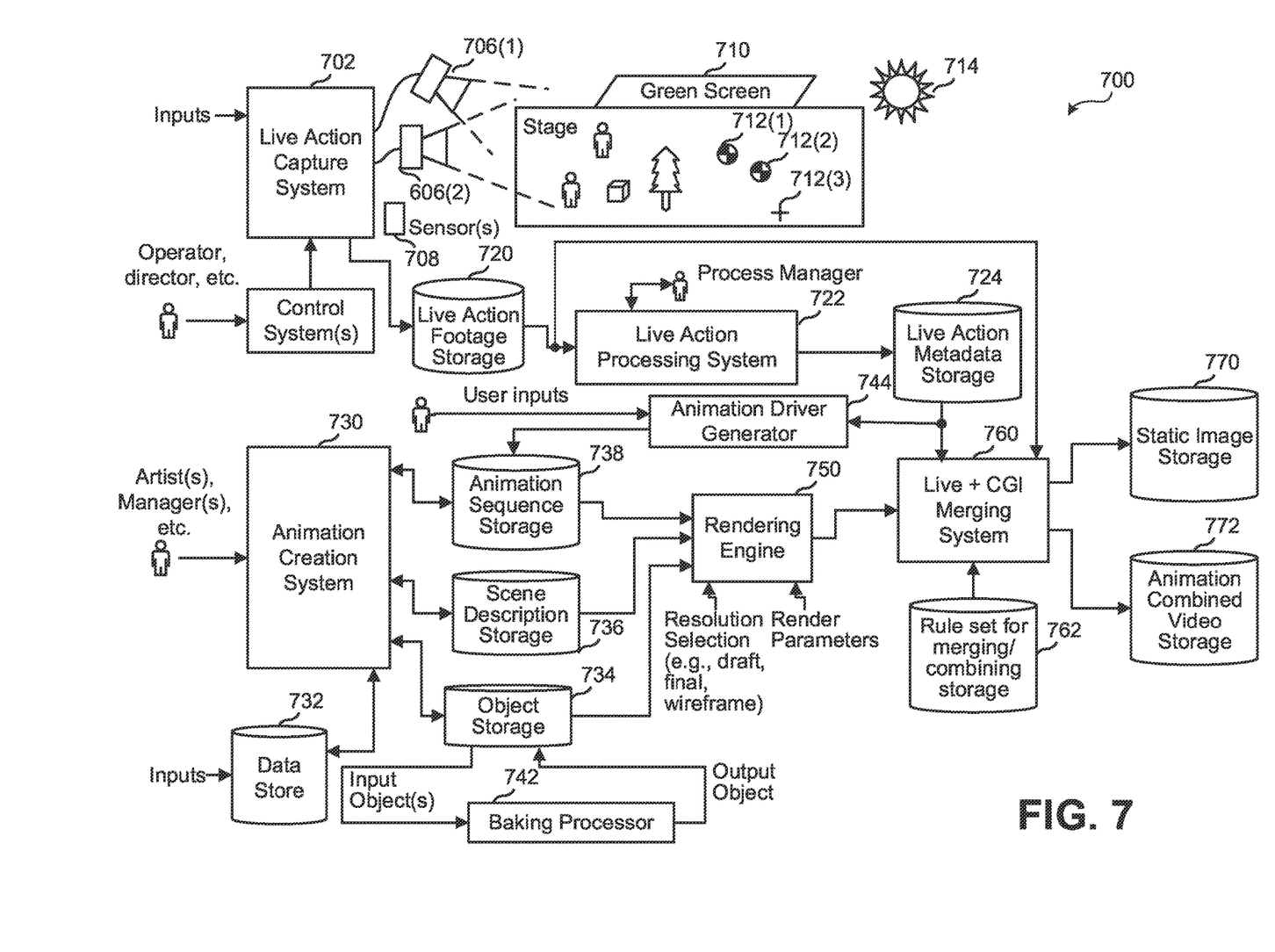
FIG. 7 illustrates an example visual content generation system as might be used to generate imagery in the form of still images and/or video sequences of images.

For example, FIG. 7 illustrates the example visual content generation system 700 as might be used to generate imagery in the form of still images and/or video sequences of images. The visual content generation system 700 might generate imagery of live action scenes, computer generated scenes, or a combination thereof. In a practical system, users are provided with tools that allow them to specify, at high levels and low levels where necessary, what is to go into that imagery. For example, a user might be an animation artist (like the artist 142 illustrated in FIG. 1) and might use the visual content generation system 700 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., the artist 142 illustrated in FIG. 1) might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 7, a live action capture system 702 captures a live scene that plays out on a stage 704. The live action capture system 702 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 706(1) and 706(2) capture the scene, while in some systems, there might be other sensor(s) 708 that capture information from the live scene (e.g., infrared cameras, infrared sensors, motion capture ("mo-cap") detectors, etc.). On the stage 704, there might be human actors, animal actors, inanimate objects, background objects, and possibly an object such as a green screen 710 that is designed to be captured in a live scene recording in such a way that it is easily overlaid with computer-generated imagery. The stage 704 might also contain objects that serve as fiducials, such as fiducials 712(1)-(3), that might be used post-capture to determine where an object was during capture. A live action scene might be illuminated by one or more lights, such as an overhead light 714.

During or following the capture of a live action scene, the live action capture system 702 might output live action footage to a live action footage storage 720. A live action processing system 722 might process live action footage to generate data about that live action footage and store that data into a live action metadata storage 724. The live action processing system 722 might include computer processing capabilities, image processing capabilities, one or more processors, program code storage for storing program instructions executable by the one or more processors, as well as user input devices and user output devices, not all of which are shown. The live action processing system 722 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 714, as that might be useful in post-processing to match computer-generated lighting on objects that are computer-generated and overlaid on the live action footage. The live action processing system 722 might operate autonomously, perhaps based on predetermined program instructions, to generate and output the live action metadata upon receiving and inputting the live action footage. The live action footage can be camera-captured data as well as data from other sensors.

An animation creation system 730 is another part of the visual content generation system 700. The animation creation system 730 might include computer processing capabilities, image processing capabilities, one or more processors, program code storage for storing program instructions executable by the one or more processors, as well as user input devices and user output devices, not all of which are shown. The animation creation system 730 might be used by animation artists, managers, and others to specify details, perhaps programmatically and/or interactively, of imagery to be generated. From user input and data from a database or other data source, indicated as a data store 732, the animation creation system 730 might generate and output data representing objects (e.g., a horse, a human, a ball, a teapot, a cloud, a light source, a texture, etc.) to an object storage 734, generate and output data representing a scene into a scene description storage 736, and/or generate and output data representing animation sequences to an animation sequence storage 738.

Scene data might indicate locations of objects and other visual elements, values of their parameters, lighting, camera location, camera view plane, and other details that a rendering engine 750 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 730 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 734 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 732 might be used to drive object presentation. For example, if an artist is creating an animation of a spaceship passing over the surface of the Earth, instead of manually drawing or specifying a coastline, the artist might specify that the animation creation system 730 is to read data from the data store 732 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 744 might read in live action metadata, such as data representing movements and positions of body parts of a live actor during a live action scene, and generate corresponding animation parameters to be stored in the animation sequence storage 738 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 722. The animation driver generator 744 might convert that movement data into specifications of how joints of an articulated CGI character are to move over time.

A rendering engine 750 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 750 might include computer processing capabilities, image processing capabilities, one or more processors, program code storage for storing program instructions executable by the one or more processors, as well as user input devices and user output devices, not all of which are shown.

The visual content generation system 700 can also include a merging system 760 that merges live footage with animated content. The live footage might be obtained and input by reading from the live action footage storage 720 to obtain live action footage, by reading from the live action metadata storage 724 to obtain details such as presumed segmentation in captured images segmenting objects in a live action scene from their background (perhaps aided by the fact that the green screen 710 was part of the live action scene), and by obtaining CGI imagery from the rendering engine 750.

A merging system 760 might also read data from a rulesets for merging/combining storage 762. A very simple example of a rule in a ruleset might be "obtain a full image including a two-dimensional pixel array from live footage, obtain a full image including a two-dimensional pixel array from the rendering engine 750, and output an image where each pixel is a corresponding pixel from the rendering engine 750 when the corresponding pixel in the live footage is a specific color of green, otherwise output a pixel value from the corresponding pixel in the live footage."

The merging system 760 might include computer processing capabilities, image processing capabilities, one or more processors, program code storage for storing program instructions executable by the one or more processors, as well as user input devices and user output devices, not all of which are shown. The merging system 760 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 760, such as modifying boundaries of segmented objects, inserting blurs to smooth out imperfections, or adding other effects. Based on its inputs, the merging system 760 can output an image to be stored in a static image storage 770 and/or a sequence of images in the form of video to be stored in an animated/combined video storage 772.

Thus, as described, the visual content generation system 700 can be used to generate video that combines live action with computer-generated animation using various components and tools, some of which are described in more detail herein. While the visual content generation system 700 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for creating an animation, the method comprising:

displaying an animation model including joint and limb components;

displaying a control point corresponding to at least one component of the animation model;

accepting a signal from a user input device to move the control point;

determining a stress amount in response to the moving control point;

indicating to a user the stress amount on at least one of the components in real-time while the control point is being moved;

creating an animation using a movement derived from the moved control point;

determining that the movement of the control point has caused a particular component to move past a breaking point; and animating a breaking of the particular component.

2. The method of claim 1, wherein the indicating includes varying a displayed color.

3. The method of claim 2, wherein the color varies as the stress amount is increased.

4. The method of claim 1, further comprising:
indicating to the user that a breaking point is being reached by a movement of the control point.

5. The method of claim 1, further comprising:
accepting a signal from a user input device to move the control point past a breaking point.

6. A computer system comprising:
one or more processors; and
a non-transient storage medium including instructions executable by the one or more processors for creating an animation by:
displaying an animation model including joint and limb components;
displaying a control point corresponding to at least one component of the animation model;
accepting a signal from a user input device to move the control point;
determining a stress amount in response to the moving control point;
indicating to a user the stress amount on at least one of the components in real-time while the control point is being moved;
creating an animation using a movement derived from the moved control point;
determining that the movement of the control point has caused a particular component to move past a breaking point; and
animating a breaking of the particular component.

7. The computer system of claim 6, wherein the indicating includes varying a displayed color.

8. The computer system of claim 7, wherein the color varies as the stress amount is increased.

9. The computer system of claim 6, further comprising:
indicating to the user that a breaking point is being reached by a movement of the control point.

10. The computer system of claim 6, wherein a component includes a non-rigid structure.

11. A computer-readable non-transient medium including instructions executable by one or more processors for creating an animation by:
displaying an animation model including joint and limb components;
displaying a control point corresponding to at least one component of the animation model;
accepting a signal from a user input device to move the control point;
determining a stress amount in response to the moving control point;
indicating to a user the stress amount on at least one of the components in real-time while the control point is being moved;
creating an animation using a movement derived from the moved control point;
determining that the movement of the control point has caused a particular component to move past a breaking point; and
animating a breaking of the particular component.

12. The computer-readable non-transient medium of claim 11, wherein the indicating includes varying a displayed color.

13. The computer-readable non-transient medium of claim 12, wherein the color varies as the stress amount is increased.

14. The computer-readable non-transient medium of claim 11, further comprising:
indicating to the user that a breaking point is being reached by a movement of the control point.

* * * * *